United States Patent [19]

Goldstein et al.

[11] Patent Number: 4,612,196

[45] Date of Patent: Sep. 16, 1986

[54] PREPARATION OF LOW ALCOHOL BEVERAGES BY REVERSE OSMOSIS

[75] Inventors: Henry Goldstein, Brookfield; Charles L. Cronan, Shorewood; Etzer Chicoye, Wauwatosa, all of Wis.

[73] Assignee: Miller Brewing Company, Milwaukee, Wis.

[21] Appl. No.: 644,500

[22] Filed: Aug. 23, 1984

[51] Int. Cl.$^4$ .................. C12C 11/00; C12G 1/00; C12G 3/00

[52] U.S. Cl. .................. 426/14; 426/15; 426/16; 426/490; 426/592

[58] Field of Search .................. 426/14, 15, 16, 490, 426/592

[56] References Cited

U.S. PATENT DOCUMENTS

| | | | |
|---|---|---|---|
| 3,926,798 | 12/1975 | Cadotte | 210/23 |
| 4,039,440 | 8/1977 | Cadotte | 210/23 |
| 4,277,344 | 7/1981 | Cadotte | 210/24 |
| 4,499,117 | 2/1985 | Bonneau | 426/14 |
| 4,532,140 | 7/1985 | Bonnome | 426/14 X |

FOREIGN PATENT DOCUMENTS 1447505  7/1973  United Kingdom .

OTHER PUBLICATIONS

Kieninger, H. L. et al., The Application of Reverse Osmosis to Remove Alcohol from Beer, Der Weihenstephaner, vol. 2, pp. 77-83, (1976).
Wucherpfennig, Von K. et al., The Partial De-Alcoholization of Beer by Means of Reverse Osmosis, Brauwelt, No. 47, (1976).
The Brewers Bulletin 77(62), Aug. 7, 1984, p. 3, "High Technology Brews a Flavorful, Low-Alcohol Beer".
J. E. Cadotte, et al., "Thin-Film Composite Reverse-Osmosis Membranes: Origin, Development, and Recent Advances," Chapter 21, *Synthetic Membranes: vol. 1, Desalination,* A. F. Turbak (Ed), ACS Symposium Series No. 153, 1981.
L. T. Rozelle, et al., "Development of New Reverse Osmosis Membranes for Desalination," Research and Development Progress Report No. 359, U.S. Dept. Interior, Oct. 1968, p. 40.
J. E. Cadotte, "Interfacial Thin-Film Composite Membranes," orally presented at "Private Conference on Membrane Technology in the 1980's," Sep. 19, 1983, Sunriver, Oregon.

*Primary Examiner*—David M. Naff
*Attorney, Agent, or Firm*—Quarles & Brady

[57] ABSTRACT

A traditional flavored fermented alcoholic beverage of low alcohol content is prepared by reverse osmosis with a thin layer composite membrane which has a support layer of polysulfone, a barrier layer of polymer prepared from a polyamine and a polyacyl, and a fiber backing. The membrane has a molecular weight cut-off of less than about 100 for organics and rejects the volatile components which contribute to flavor and aroma and permits about 25 to about 30% alcohol in the beverage to pass.

7 Claims, No Drawings

PREPARATION OF LOW ALCOHOL BEVERAGES BY REVERSE OSMOSIS

FIELD OF THE INVENTION

The present invention relates to a process for the preparation of fermented beverages, such as malt beverages, containing low concentrations of alcohol. More particularly, it relates to a method of preparing such beverages by the use of reverse osmosis techniques.

BACKGROUND OF THE INVENTION

Malt beverages which contain lower than traditional alcohol concentrations have been made and sold for many years. Recently there has been a renewed interest in such beverages and several major breweries have started to market such products.

Malt beverages, such as beer, containing lower amounts of alcohol may be made by modifying the fermentation process conditions to produce less alcohol or by using a carbohydrate source that will yield less alcohol. Alternatively, such beverages can be prepared by diluting the production of a conventional malt beverage fermentation with water to obtain the lower alcohol percentage or by removing the alcohol by evaporation or distillation.

None of the foregoing approaches is very satisfactory because they result in malt beverages that do not have the full flavor and consistency of the traditional malt beverages.

In British Pat. No. 1,447,505, a method of preparing a low alcohol beer is described which comprises using a reverse osmosis membrane to remove alcohol and water from a finished fermented beer. A number of membranes are described as being usable including aminated polyamid membranes, cellulose acetate membranes and nylon membranes. Attempts to prepare a low alcohol beer using the teachings and membranes of the aforementioned patent have not resulted in the preparation of low alcohol malt beverages of suitable or satisfactory flavor and composition.

Reverse osmosis has the advantages of speed of operation, mild operating conditions, and low operating costs compared to various other separation processes such as evaporation, dialysis, and the like. Such advantages are especially important where the material to be processed, such as malt beverages, is thermally unstable, or contains relatively large volumes of solvent to be processed.

It would be desirable to have a reverse osmosis method of preparing low alcohol malt beverages which contain the full flavor and consistency of traditional malt beverages.

SUMMARY OF THE INVENTION

It is an object of the present invention to disclose a reverse osmosis method of preparing a low alcohol malt beverage having the full flavor and consistency of a traditional malt beverage.

We have discovered that a low alcohol malt beverage can be prepared by a method which comprises subjecting a traditional malt beverage prepared by conventional fermentation to reverse osmosis using a thin-film composite membrane which has a polyamide active barrier on a microporous polysulfone support. The membrane retains the volatiles and other flavor constituents of the beer and allows about 25 to about 30% of the alcohol in the malt beverage to pass therethrough.

The resulting product has the full flavor and consistency of a traditional malt beverage but a lower alcohol content.

"Reverse osmosis" as used herein, relates to a membrane separation process in which a solution containing a solute(s) having molecular dimensions greater than or about the same order of magnitude of the molecular dimensions of the solvent in which it is dissolved, is depleted of solvent by being subjected to a pressure that forces the solvent to pass through a membrane whose physical and chemical properties result in leaving the solute(s) to concentrate.

Three terms are used repeatedly by those skilled in the art relating to pressure activated membrane separation. They are the following:

(a) "Feed" which refers to the original solution or recycled concentrate;

(b) "Permeate" which refers to the liquid including solvent which passes through the membrane; and (c) "Concentrate" or "retentate" which refers to the liquid which remains behind the contains the concentrated solute.

The reverse osmosis process results in production of two liquid factions, the "permeate" and the "concentrate" or "retentate". It is the "concentrate" or "retentate" which can be used as a low alcohol malt beverage.

DESCRIPTION OF THE PREFERRED EMBODIMENT

In the preferred practice of the present invention, the feed is a beer prepared by fermentation of a wort consisting of malt or malt and a fermentable cereal adjunct. However, as previously indicated, the "feed" could be almost any alcoholic beverage obtained by the fermentation of grain, fruit and other carbohydrate sources, such as wine, sake, beer, stout or ale. Alcoholic beverages prepared by the fermentation of grain or other carbohydrate source with yeast usually contain water, alcohol, carbohydrates, proteins, protein fragments, amino acids, inorganics, sugars and volatiles. They also may contain added ingredients such as hop acids and volatiles. The term "beer" as used herein is intended to include all such alcoholic beverages.

The preferred reverse osmosis membrane is a polyamide, polysulfone-supported thin-film composite membrane which is rated for pressures up to 900 psi.

The preferred membrane is a thin-film composite having a microporous support which is a polymer of 4,4'-isopropylidene diphenol and 4,4'-dihydroxydiphenol sulfone, a resin commercially available from Union Carbide under the name Bakelite P-3500.

The support layer is prepared by dissolving the resin (approximately 1 part to 5 parts by weight) in DMF (dimethyl formamide), at 100° C. A film of approximately 5 mils thickness is spread on a glass plate. The plate is then immersed in water or aqueous 2% DMF, a process which simultaneously gels the film and releases it from the plate. The final film thickness is about 2 mils.

The active polyamide barrier layer is prepared by interfacial polymerization. An aqueous solution of a polyamine (such as an aromatic diamine) is applied to the air side of the polysulfone support. A polyacyl reactant, in a non-polar solvent, is then placed in contact with the support such that polymerization occurs at the liquid/liquid contact boundary. The polymerization is essentially complete within seconds. An example of the use of a 2% w/w aqueous m-phenylene diamine solution to first wet the polysulfone support and a 0.1% w/v 1,3,5-benzenetricarboxylic acid chloride (a.k.a. trimesoyl chloride) in Freon TF to complete the formation of the polyamide barrier by in-situ interfacial polymerization.

A fiber backing of polyester or polyethylene fibers, offers non-reactive structural integrity.

The preferred membrane is available from Paterson Candy International under the designation ZF-99.

Suitable membranes may be prepared by following the teachings of J. D. Cadotte et al which are set forth in the following references and incorporated by reference herein:

1. J. E. Cadotte and R. J. Petersen, "Thin-Film Composite Reverse-Osmosis Membranes: Origin, Development, and Recent Advances," Chapter 21, *Synthetic Membranes: Volume I Desalinization*, A. F. Turbak (Ed), ACS Symposium Series No. 153, 1981.

2. L. T. Rozelle, J. E. Cadotte, R. D. Corneliussen and E. E. Erickson, "Development of New Reverse Osmosis Membranes for Desalinization," Research and Development Progress Report No. 359, U.S. Dept. Interior, October, 1968, p. 40.

3. J. E. Cadotte, "Reverse Osmosis Membrane," U.S. Pat. No. 3,926,798, Dec. 16, 1975.

4. J. E. Cadotte, "Reverse Osmosis Membrane," U.S. Pat. No. 4,039,440, Aug. 2, 1977.

5. J. E. Cadotte, "Interfacial Thin-Film Composite Membranes," presented at "Private Conference on Membrane Technology in the 1980's," Sept. 19, 1983, Sunriver, Oreg.

6. J. E. Cadotte, "Interfacially Synthesized Reverse Osmosis Membrane," U.S. Pat. No. 4,277,344, July 7, 1981.

In the preferred process, the membrane is used with a pressure of less than 900 psi at ambient temperatures or less. However, commercial production would conceivably employ larger commercial reverse osmosis units with membranes capable of handling pressures of up to about 1200 psi. The especially preferred membrane ZF-99 has better than 98% rejection from a 5000 mg/1 NaCl solution at 580 psi and 15° C., a minimum water permeate flux of 21 gal/day-ft$^2$ and a molecular weight cut-off of less than 100 for organics. The membrane has a normal operating pressure of 500 to 900 psig.

The practice of the invention may be further illustrated by the example which follows:

EXAMPLE 1

Two gallons of beer having an ethyl alcohol content of 3.7% on a weight by weight basis was concentrated using a table top reverse osmosis unit made by Paterson Candy International of Great Britain. The table top unit employed a ZF-99 membrane having a surface area of 0.07 m$^2$, which was rated for pressures up to 600 psi. The membrane was in the form of 6 one foot long membrane tubes having an inner diameter of 12.51 mm. The unit was operated at between 2° and 19° C. using a pressure of 600 psi for one hour. Samples of permeate were collected. A similar experiment was conducted using an Osmonics Incorporated (Hopkins, MN) Osmo 1119 Reverse Osmosis unit with a SEPA 97 cellulose acetate membrane. Gas chromatographic volatile analyses were performed on feed and permeate samples. The results of the analyses are summarized in Table I.

TABLE I

|  | Cellulose Acetate Concentration (ppm) | | | Thin-film Composite $Z^{F}$-99 Concentration (ppm) | | |
| --- | --- | --- | --- | --- | --- | --- |
|  | Feed | Permeate | % Rejection | Feed | Permeate | % Rejection |
| Acetaldehyde | 1.1 | 0.9 | 18 | 1.2 | 0.3 | 75 |
| n-Propanol | 16.2 | 14.5 | 10 | 11.7 | 0.0 | 100 |
| Ethyl Acetate | 41.0 | 40.4 | 1 | 26.0 | 1.0 | 96 |
| Isobutanol | 25.3 | 19.4 | 23 | 14.4 | 0.0 | 100 |
| Isopropyl Acetate | 0.0 | 0.0 | — | 0.0 | 0.0 | — |
| Ethyl Propanoate | 0.2 | 0.1 | 50 | 0.1 | 0.0 | 100 |
| Active Amyl Alcohol | 23.0 | 17.8 | 23 | 20.3 | 0.0 | 100 |
| Isoamyl Alcohol | 82.9 | 66.2 | 20 | 42.8 | 0.4 | 99 |
| Isobutyl Acetate | 0.2 | 0.2 | 0 | 0.1 | 0.0 | 100 |
| Ethyl Butanoate | 0.2 | 0.2 | 0 | 0.1 | 0.0 | 100 |
| n-Butyl Acetate | 0.0 | 0.1 | — | 0.0 | 0.0 | — |
| Isoamyl Acetate | 4.8 | 4.3 | 10 | 2.7 | 0.0 | 100 |
| Total | 194.9 | 164.0 | 16 | 120.0 | 1.7 | 99 |
| Diacetyl | 0.022 | 0.011 |  | 0.015 | 0.000 | 100 |
| 2,3-Pentanedione | 0.017 | 0.008 |  | 0.016 | 0.000 | 100 |
| Total | 0.039 | 0.019 | 50 | 0.031 | 0.000 | 100 |
| Ethanol % | 5.3 | 5.4 | 0 | 3.7 | 1.0 | 73 |

% Rejection = $\frac{\text{Feed-Permeate}}{\text{Feed}} \times 100$

From Table I it is apparent that with the exception of acetaldehyde, only very small amounts of volatiles were not rejected by the ZF-99 membrane and hence retained in the concentrate. From previous work with cellulose acetate membranes, we noted that the acetaldehyde is probably largely being produced during the process and not necessarily premeating through the membrane, at least in such large quantities. In any event, losses of small amounts of acetaldehyde probably do not effect beer flavor to any appreciable degree. The loss of other volatiles such as ethyl acetate and isoamyl alcohol is very small with the ZF-99 membrane, especially when compared to the results obtained using the cellulose acetate (CA) membranes (see Table I).

In a subsequent sealed up test acceptable beers containing 1.25% ethanol and 1.85% ethanol were prepared from a stock beer containing 3.75% ethanol using the ZF-99 membrane in the form of 18 eight foot long membrane tubes having a total membrane area of 1.73 m$^2$.

It is significant that 99% of the volatiles are rejected by the ZF-99 membrane whereas only 16% of the volatiles are rejected by the CA membrane. The result is that the concentrate obtained using the ZF-99 membrane has about 25% to about 30% less alcohol than the feed beer but all the important volatiles that contribute to flavor and aroma. Thus, the concentrate, although containing less alcohol, has the flavor and aroma of a traditional beer.

It will be apparent to those skilled in the art that the method of the invention can be used with a variety of alcoholic feeds to obtain concentrates which contain less alcohol and retain the volatiles, flavor and aroma of the feed. Therefore, the invention is not to be limited except by the claims which follow:

We claim:

1. A method of reducing the alcohol content of a fermented alcoholic beverage to produce an alcoholic beverage concentrate having less alcohol content but the flavor and aroma of a fermented alcoholic beverage prior to reducing the alcohol content, said method comprising subjecting a fermented alcoholic beverage to reverse osmosis employing a thin film composite membrane having a support layer of polysulfone, a barrier layer of a polymer prepared from a polyamine and a polyacyl and a fiber backing, which membrane has a molecular weight cut-off of less than about 100 for organics and rejects the volatile components which contribute to flavor and aroma and permits about 25 to about 30% of the alcohol in the beverage to pass through and then collecting the concentrate.

2. The method of claim 1 in which the beverage subjected to reverse osmosis is a malt beverage.

3. The method of claim 1 in which the beverage subjected to reverse osmosis is sake.

4. The method of claim 1 in which the beverage subjected to reverse osmosis is wine.

5. A method of claim 1 in which the beverage subjected to reverse osmosis is beer.

6. A low alcohol fermented beverage concentrate prepared by the method of claim 1.

7. A low alcohol beer concentrate prepared by the method of claim 5.

* * * * *